US010955012B2

(12) United States Patent
Kurosu et al.

(10) Patent No.: US 10,955,012 B2
(45) Date of Patent: Mar. 23, 2021

(54) ELECTROMAGNETIC CONNECTING DEVICE (71) Applicant: OGURA CLUTCH CO., LTD., Gunma (JP)

(72) Inventors: Yoshihiro Kurosu, Gunma (JP); Yoshinori Fujisawa, Gunma (JP); Daichi Takahashi, Gunma (JP)

(73) Assignee: OGURA CLUTCH CO., LTD., Gunma (JP)

( * ) Notice: Subject to any disclaimer, the term of this patent is extended or adjusted under 35 U.S.C. 154(b) by 107 days.

(21) Appl. No.: 16/283,485

(22) Filed: Feb. 22, 2019

(65) Prior Publication Data
US 2019/0264757 A1 Aug. 29, 2019

(30) Foreign Application Priority Data

Feb. 27, 2018 (JP) .............................. JP2018-032816

(51) Int. Cl.
*F16D 27/112* (2006.01)
*F16D 67/02* (2006.01)
(Continued)

(52) U.S. Cl.
CPC ............ *F16D 27/112* (2013.01); *F16D 27/14* (2013.01); *F16D 67/02* (2013.01); *F16F 1/027* (2013.01);
(Continued)

(58) Field of Classification Search
CPC .. F16D 27/112; F16D 27/14; F16D 2027/007; F16D 2027/008; F16D 67/02;
(Continued)

(56) References Cited

U.S. PATENT DOCUMENTS 4,574,930 A * 3/1986 Koitabashi ............ F16D 27/112
192/200
5,119,915 A 6/1992 Nelson
(Continued)

FOREIGN PATENT DOCUMENTS

JP H06-010973 1/1994

OTHER PUBLICATIONS

European Search Report and Written Opinion received for EP Patent Application No. 19157969.7, dated Sep. 11, 2019, 7 pages.
(Continued)

*Primary Examiner* — David R Morris
*Assistant Examiner* — Lori Wu
(74) *Attorney, Agent, or Firm* — Womble Bond Dickinson (US) LLP (57) ABSTRACT

An electromagnetic connecting device includes a flange of a hub, an armature supported by the flange via a leaf spring, a rotor accommodating an electromagnetic coil, and an anti-vibration member. When an electric current is supplied to the electromagnetic coil, the armature moves in the axial direction of the hub against the spring force of the leaf spring, and is attracted to the rotor. The leaf spring includes a moving portion that moves in the axial direction together with the movement of the armature. The anti-vibration member is fixed to the moving portion of the leaf spring. The anti-vibration member includes a stopper that comes in contact with the flange, and a damper that comes in contact with the armature. With this configuration, an electromagnetic connecting device capable of reducing an impact sound both when the armature is attracted and released can be manufactured at a low manufacturing cost.

10 Claims, 9 Drawing Sheets

(51) Int. Cl.
*F16D 27/14* (2006.01)
*F16F 15/12* (2006.01)
*F16F 1/02* (2006.01)
*F16F 15/124* (2006.01)
*F16F 1/32* (2006.01)
*F16F 15/121* (2006.01)
*F16D 27/00* (2006.01)
*F02B 67/06* (2006.01)

(52) U.S. Cl.
CPC .......... *F16F 1/324* (2013.01); *F16F 15/1201* (2013.01); *F16F 15/124* (2013.01); *F16F 15/1215* (2013.01); *F02B 67/06* (2013.01); *F16D 2027/007* (2013.01); *F16D 2027/008* (2013.01); *F16D 2300/22* (2013.01)

(58) Field of Classification Search
CPC . F16D 2300/22; F16F 15/1201; F16F 15/124; F16F 15/1215; F16F 1/027; F16F 1/324; F02B 67/06
See application file for complete search history.

(56) References Cited

U.S. PATENT DOCUMENTS

| | | | | |
|---|---|---|---|---|
| 5,445,256 | A | * | 8/1995 | Tabuchi ................ F16D 27/112 192/200 |
| 5,560,464 | A | * | 10/1996 | Gonda .................. F16D 27/112 192/30 V |
| 5,575,370 | A | * | 11/1996 | Gonda .................. F16D 27/112 192/30 V |
| 6,286,650 | B1 | | 9/2001 | Tabuchi et al. |
| 6,823,974 | B2 | | 11/2004 | Hayashi |
| 2003/0159901 | A1 | * | 8/2003 | Hayashi ................ F16D 27/112 192/84.941 |
| 2004/0251106 | A1 | * | 12/2004 | Shin ..................... F16D 27/112 192/84.94 |
| 2011/0127136 | A1 | | 6/2011 | Sakuraba et al. |

OTHER PUBLICATIONS

Examination Report received for Indian Patent Application No. 201914006755, dated Jun. 30, 2020, 6 pages.

* cited by examiner

ELECTROMAGNETIC CONNECTING DEVICE

BACKGROUND OF THE INVENTION

The present invention relates to an electromagnetic connecting device including an anti-vibration member that reduces an impact sound generated when an armature is magnetically attracted or released.

An example of an electromagnetic connecting device having a device that reduces an impact sound in operation is an electromagnetic clutch disclosed in Japanese Patent Laid-Open No. 6-10973 (literature 1). This electromagnetic clutch includes an anti-vibration member that reduces an impact sound when an armature is magnetically attracted to a rotor, and a cushion member that reduces an impact sound when the armature is returned to a release position by the spring force of a leaf spring.

This electromagnetic clutch includes two types of members, i.e., the anti-vibration member and the cushion member, in order to reduce the impact sound both when the armature is magnetically attracted to the rotor and when the armature is released from it. Therefore, this electromagnetic clutch has the problem that the manufacturing cost increases because the number of parts increases.

This problem similarly arises when the anti-vibration member and the cushion member disclosed in literature 1 are applied to an electromagnetic brake. In this case, the armature disclosed in literature 1 is electromagnetically attracted to a fixed stator (field core), instead of the rotor.

SUMMARY OF THE INVENTION

It is an object of the present invention to manufacture, with a low manufacturing cost, an electromagnetic connecting device capable of reducing an impact sound both when an armature is magnetically attracted to an attracting member such as a rotor of an electromagnetic clutch or a fixed stator (field core) of an electromagnetic brake and when the armature is released from the attracting member.

In order to achieve the above object according to the present invention, there is provided an electromagnetic connecting device comprising a rotary member rotatable around an axis, an armature arranged in an axial direction parallel to the axis with respect to the rotary member, a leaf spring including a base end portion fixed to the rotary member, and a free end portion connected to the armature, an electromagnetic coil, an attracting member arranged on an opposite side of the rotary member across the armature, accommodating the electromagnetic coil, and configured to attract the armature by moving the armature in the axial direction against a spring force of the leaf spring when an electric current is supplied to the electromagnetic coil, and an anti-vibration member formed by an elastic material, wherein the leaf spring includes a moving portion that includes the free end portion and moves in the axial direction together with movement of the armature, and a non-moving portion that includes the base end portion and does not move in the axial direction, the anti-vibration member is fixed to the moving portion of the leaf spring, and the anti-vibration member includes a stopper that comes in contact with one of the rotary member and the non-moving portion of the leaf spring from a side of the armature, and a damper that comes in contact with the armature from a side of the rotary member.

DESCRIPTION OF THE PREFERRED EMBODIMENTS

First Embodiment

The first embodiment of an electromagnetic connecting device of the present invention will be explained in detail below with reference to FIGS. 1 to 8. In this embodiment, an example of a case in which the present invention is applied to an electromagnetic clutch as one electromagnetic connecting device will be explained.

Figure 1:
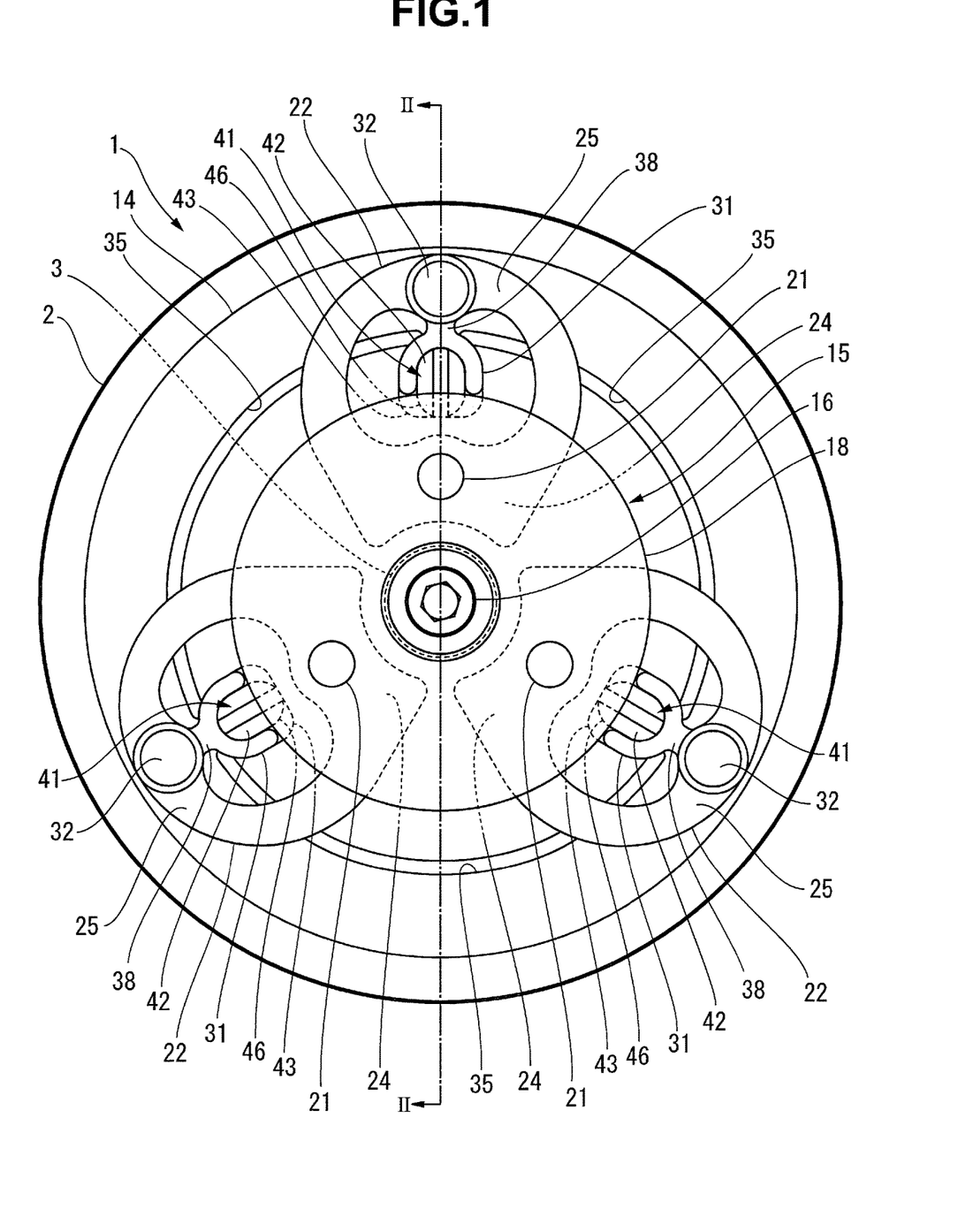
FIG. 1 is a front view of an electromagnetic clutch as the first embodiment of the present invention.

An electromagnetic clutch 1 shown in FIG. 1 selectively transmits the rotation of a rotor 2 drawn on the outermost side in FIG. 1 to a rotating shaft 3 drawn by the broken line in the center of FIG. 1.

Figure 2:
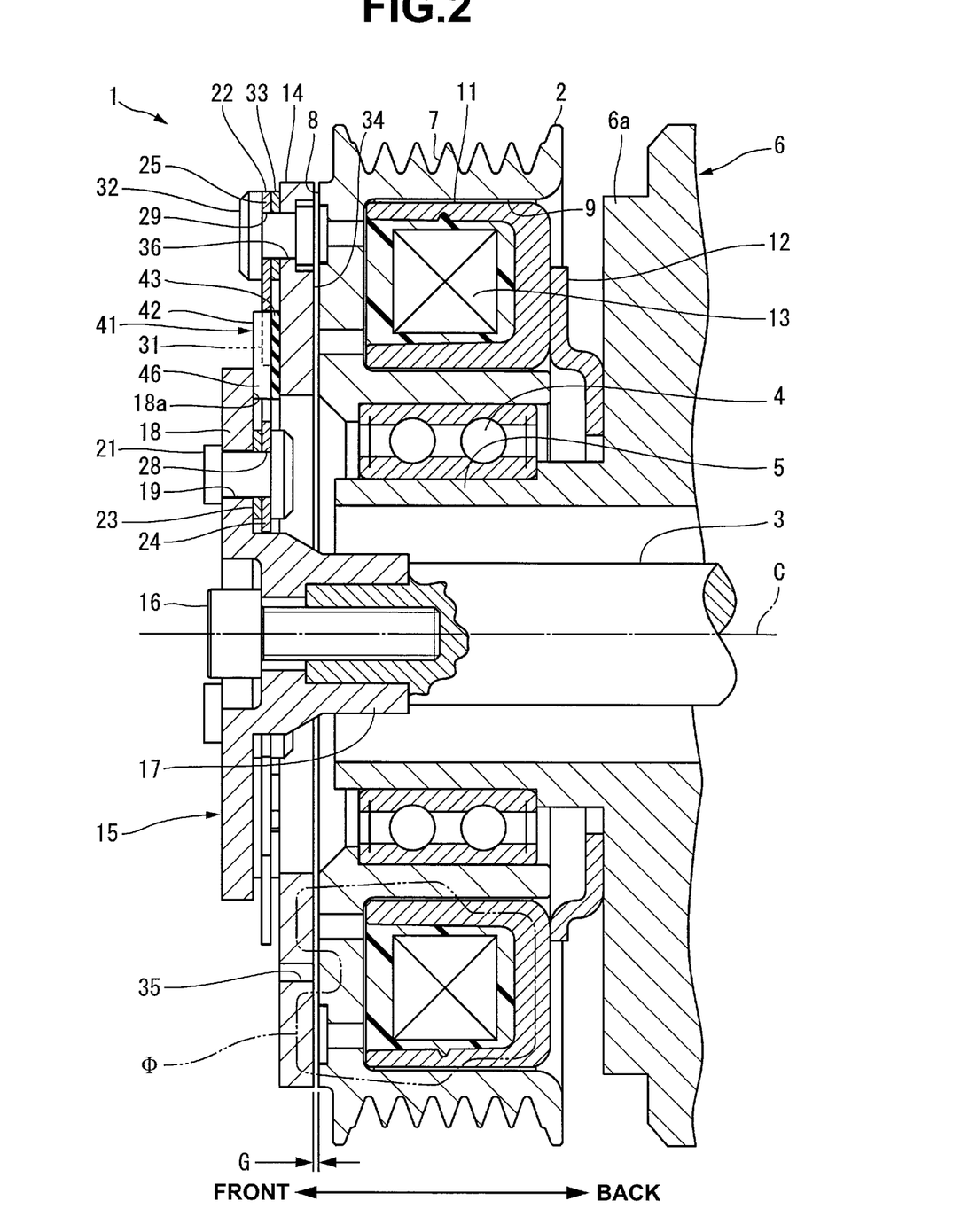
FIG. 2 is a sectional view taken along a line II-II shown in FIG. 1.

The rotor 2 is formed into a ring-like shape. As shown in FIG. 2, the rotor 2 is rotatably supported by a cylinder 5 via a bearing 4 fitted on the axial portion of the rotor 2. The rotor 2 rotates around an axis C with respect to the cylinder 5. The cylinder 5 projects toward the inner circumference of an end portion 6a of a support member 6. The explanation will be made by assuming that a direction (the left direction in FIG. 1) in which the cylinder 5 projects from the end portion 6a of the support member 6 is the front side of the electromagnetic clutch 1, and a direction (the right direction in FIG. 1) opposite to this direction is the back side of the electromagnetic clutch 1. The front side and back side of the electromagnetic clutch 1 match the positive direction and negative direction of an axial direction parallel to the axis C.

A plurality of pulley grooves 7 are formed on the outer circumferential portion of the rotor 2. The rotor 2 rotates when power is transmitted by a belt (not shown) wound around the pulley grooves 7. A flat attraction surface 8 is formed on the front end of the rotor 2. An annular groove 9 is open in the rear end of the rotor 2. A field core 11 is inserted into the annular groove 9. The field core 11 is formed into an annular shape, and supported by the support member 6 via an attaching bracket 12. An electromagnetic coil 13 that applies a magnetic flux to the rotor 2 is formed inside the field core 11. When an electric current is supplied to the electromagnetic coil 13, a magnetic circuit $\Phi$ is formed by the field core 11, the rotor 2, and an armature 14 positioned in front of and in the vicinity of the rotor 2.

The rotating shaft 3 described above is arranged in the axial portion of the cylinder 5 supporting the rotor 2. The axis C extends through the center of the rotating shaft 3. A hub 15 is fixed to the front end portion of the rotating shaft 3 by a fixing bolt 16. The rotating shaft 3 and the hub 15 rotate around the axis C. The hub 15 includes a cylindrical boss portion 17 (see FIG. 3) in which the front end portion of the rotating shaft 3 is fitted, and a disc-like flange portion 18 (see FIGS. 1 and 4) extending from the front end portion of the boss portion 17 to the outside in the radial direction.

As shown in FIG. 1, three leaf springs 22 are attached by three first rivets 21 in positions that divide the flange portion 18 into three equal portions in the circumferential direction. As shown in FIG. 2, the leaf springs 22 are positioned behind the flange portion 18. The leaf spring 22 is fixed to the flange portion 18 by the first rivet 21 in a state in which a first spacer 23 is sandwiched between a rear surface 18a of the flange portion 18 and the leaf spring 22. The first rivet 21 is inserted into a through hole 19 formed in the flange portion 18. Note that although not shown, a projection that replaces the first spacer 23 can be formed on the flange portion 18. This projection is formed by pushing a part of the flange portion 18 by pressing.

Figure 5:
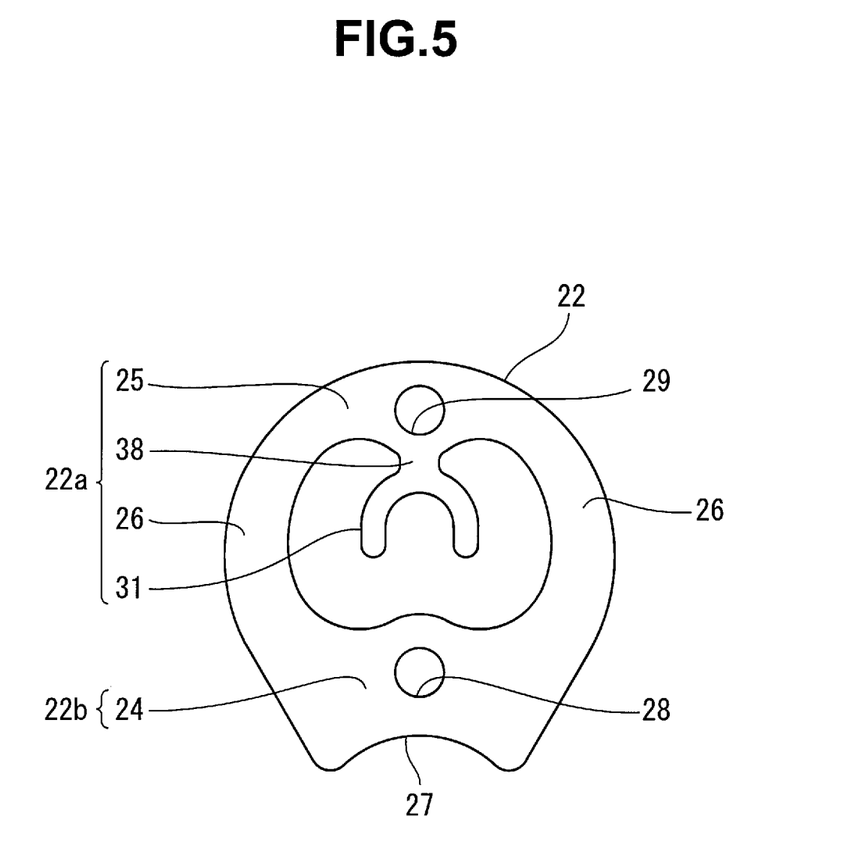
FIG. 5 is a front view of the leaf spring.

As shown in FIG. 5, the leaf spring 22 is formed into a ring-like shape. The leaf spring 22 is formed by punching a metal plate (not shown) made of a spring material into a predetermined shape by using a press machine. Note that the leaf spring 22 can also be formed by a so-called laser cutting method. When forming the leaf spring 22 by the laser cutting method, a metal plate made of a spring material is irradiated with a laser beam, thereby cutting out a necessary portion from the metal plate.

The leaf spring 22 includes a base end portion 24 positioned in one end portion (a lower end portion in FIG. 5) of the leaf spring 22 in the radial direction, a free end portion 25 positioned in the other end portion in the radial direction, and two connecting portions 26 connecting the base end portion 24 and the free end portion 25.

An arcuate recess 27 that is recessed toward the central portion of the leaf spring 22 is formed in the outer circumferential portion of the base end portion 24 of the leaf spring 22. The recess 27 is formed into a shape that is fitted on the boss portion 17 of the hub 15. Since the recess 27 is fitted on the boss portion 17, the attaching angle of the leaf spring 22 can be determined such that the base end portion 24 and the free end portion 25 of the leaf spring 22 are arranged in the radial direction of the hub 15.

A first rivet insertion hole 28 for inserting the first rivet 21 described above is formed in the base end portion 24 of the leaf spring 22. The base end portion 24 of the leaf spring 22 is fixed to the flange portion 18 of the hub 15 by the first rivet 21. On the other hand, the free end portion 25 of the leaf spring 22 can bend in the axial direction of the hub 15 together with the connecting portions 26. A second rivet insertion hole 29 is formed in the free end portion 25 of the leaf spring 22, and a U-shaped arm 31 is formed on the free end portion 25. The second rivet insertion hole 29 is a hole for inserting a second rivet 32 (see FIG. 2). The second rivet 32 connects the free end portion 25 of the leaf spring 22 and the armature 14.

As shown in FIG. 2, the armature 14 is positioned behind the leaf springs 22. That is, the armature 14 is arranged in the negative direction of the axial direction of the hub 15, with respect to the flange portion 18 of the hub 15. The armature 14 is fixed to the free end portion 25 of the leaf spring 22 by the second rivet 32, in a state in which a second spacer 33 is sandwiched between the free end portion 25 of the leaf spring 22 and the armature 14. Accordingly, the armature 14 is supported by the hub 15 via the leaf springs 22 so as to be movable in the axial direction of the hub 15. Note that although not shown, a projection that replaces the second spacer 33 can be formed on the armature 14. This projection can be formed by pushing a part of the armature 14 by pressing.

Figure 3:
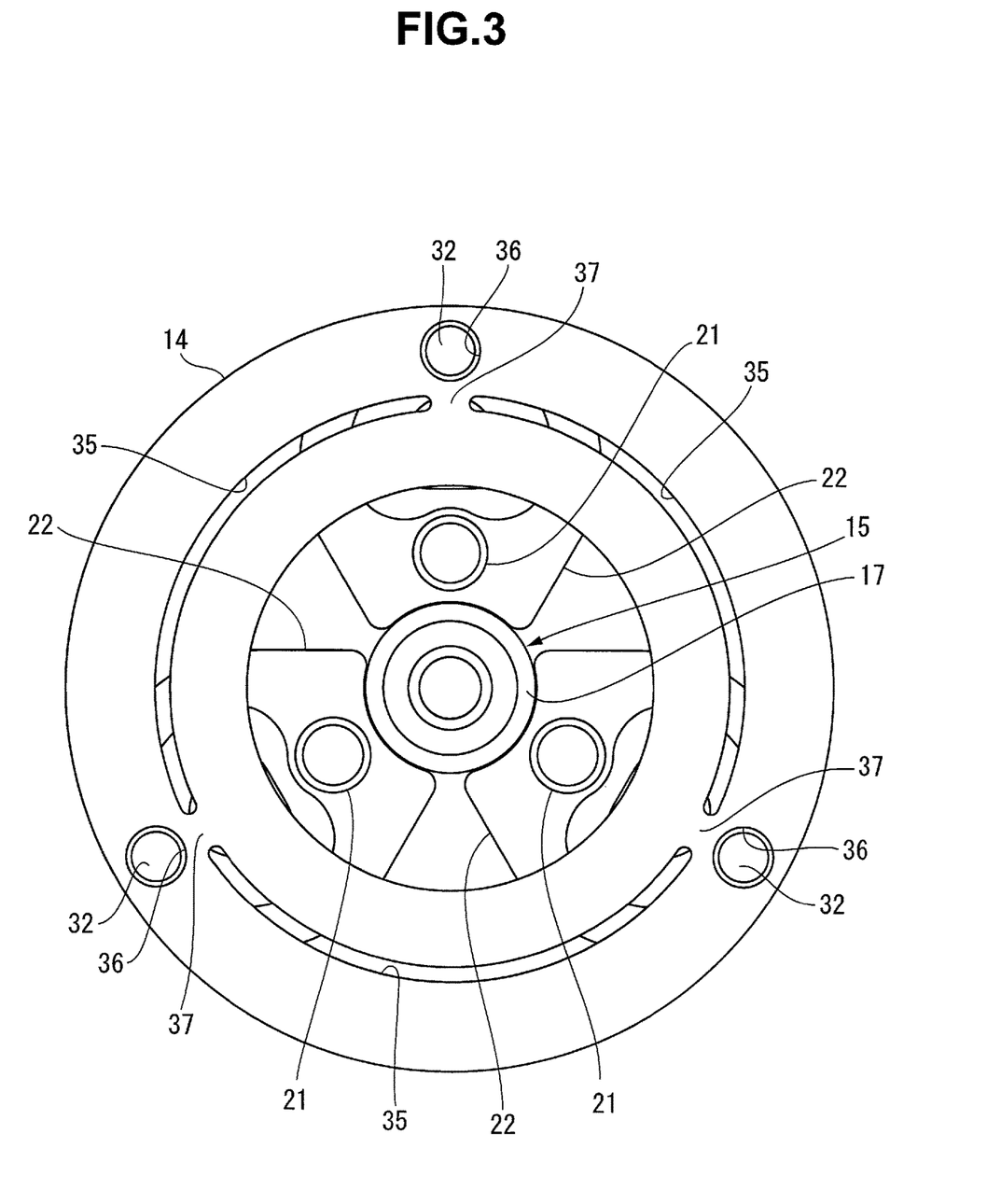
FIG. 3 is a rear view in which an assembly including a hub, a leaf spring, and an armature is viewed from behind.
Figure 4:
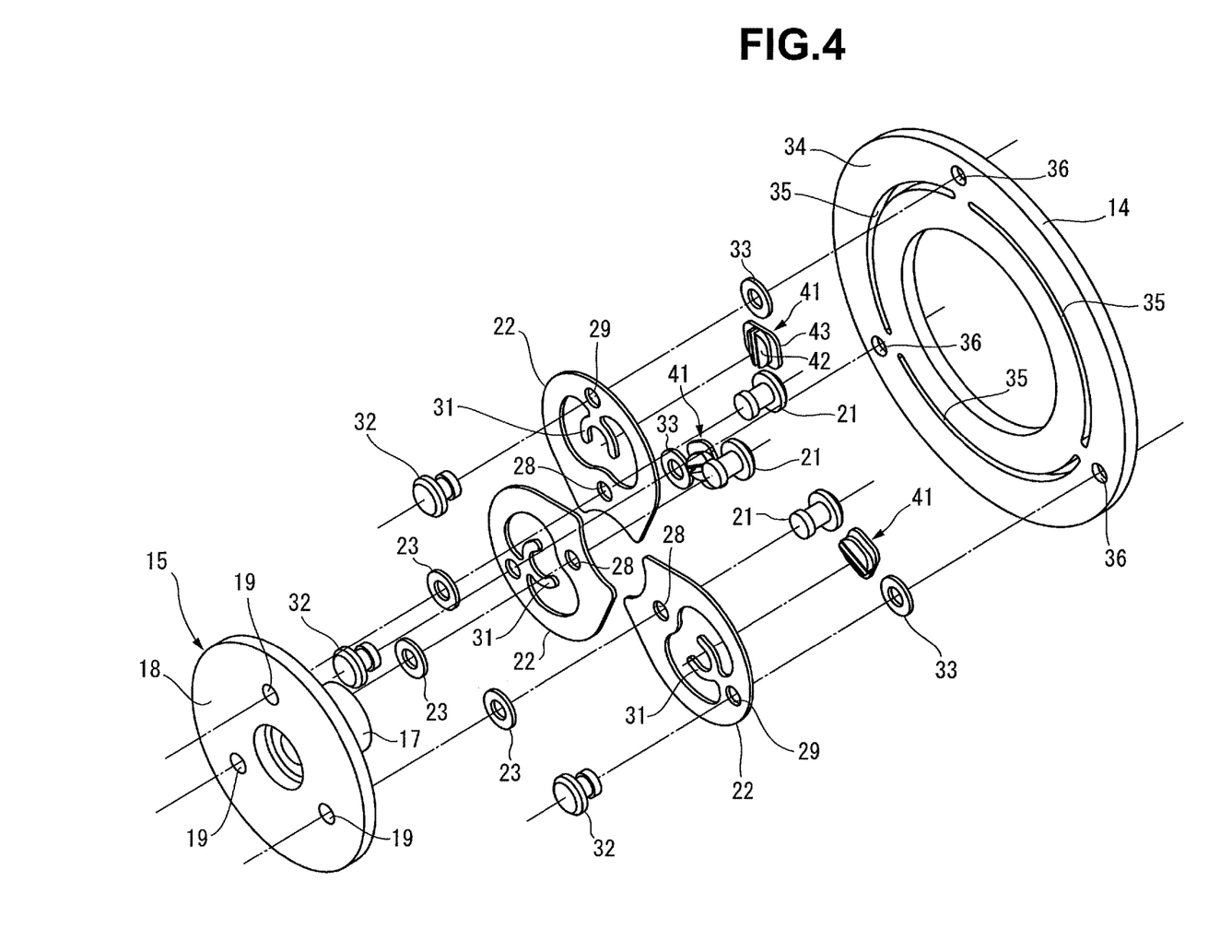
FIG. 4 is an exploded perspective view of the assembly including the hub, the leaf spring, and the armature.

As shown in FIGS. 3 and 4, the armature 14 is formed into a circular plate-like shape. A flat attraction surface 34 opposite to the rotor 2 is formed on the armature 14, and three arcuate slits 35 for forming a magnetic path are formed in the armature 14. The slits 35 are formed in positions that divide the central portion of the armature 14 in the radial direction into three equal portions in the circumferential direction. Connecting portions 37 are formed between adjacent slits 35.

As shown in FIG. 2, three through holes 36 for inserting the second rivets 32 described above are formed in the outer circumferential portion of the armature 14. As shown in FIG. 3, the through holes 36 are formed in positions that divide the armature 14 into three equal portions in the circumferential direction, and are adjacent to the connecting portions 37 described above. The through hole 36, the connecting portion 37, and the first rivet 21 are arranged in the radial direction of the armature 14.

As shown in FIG. 2, the rotor 2 described above is positioned behind the armature 14. That is, the rotor 2 is arranged on the opposite side of the flange portion 18 of the hub 15 across the armature 14 (i.e. the rotor 2 is arranged on the side of the armature 14, which is opposite to the flange portion 18 of the hub 15). The armature 14, the rotor 2, the rotating shaft 3, and the hub 15 are positioned on the same axis.

As shown in FIG. 5, the arm 31 of the leaf spring 22 is formed into a U-shape when viewed from the front side (when viewed in the axial direction of the hub 15). The apex (central portion) of the arm 31 is connected to an elastic deformation allowing portion 38 projecting toward the base end portion 24 of the leaf spring 22 from the free end portion 25. In the circumferential direction of the armature 14, the arm 31 and the elastic deformation allowing portion 38 are arranged in the same positions as the first and second rivets 21 and 32.

The central portion of the arm 31 is connected to the free end portion 25 of the leaf spring 22 via the elastic deformation allowing portion 38, and the two end portions of the arm 31 project toward the base end portion 24 of the leaf spring 22. As shown in FIG. 1, therefore, the arm 31 opens toward the base end portion 24 of the leaf spring 22, that is, toward the axis C of the hub 15, when viewed from the front side. The length of the arm 31 in the radial direction of the armature 14 is so set that the arm 31 is positioned outside the flange portion 18 of the hub 15 in the radial direction, in the assembled state shown in FIG. 1.

As shown in FIG. 1, an anti-vibration member 41 is attached to the arm 31. The anti-vibration member 41 suppresses an impact sound generated from the armature 14. The anti-vibration member 41 is formed into a predetermined shape by using an elastic material such as a rubber material. The anti-vibration member 41 according to this embodiment includes a stopper portion 42 to be fitted in the arm 31, and a damper portion 43 (see FIGS. 6 and 7) projecting toward the armature 14 from the stopper portion 42 so as to extend behind the arm 31. The stopper portion 42 and the damper portion 43 are integrated.

Figure 6:
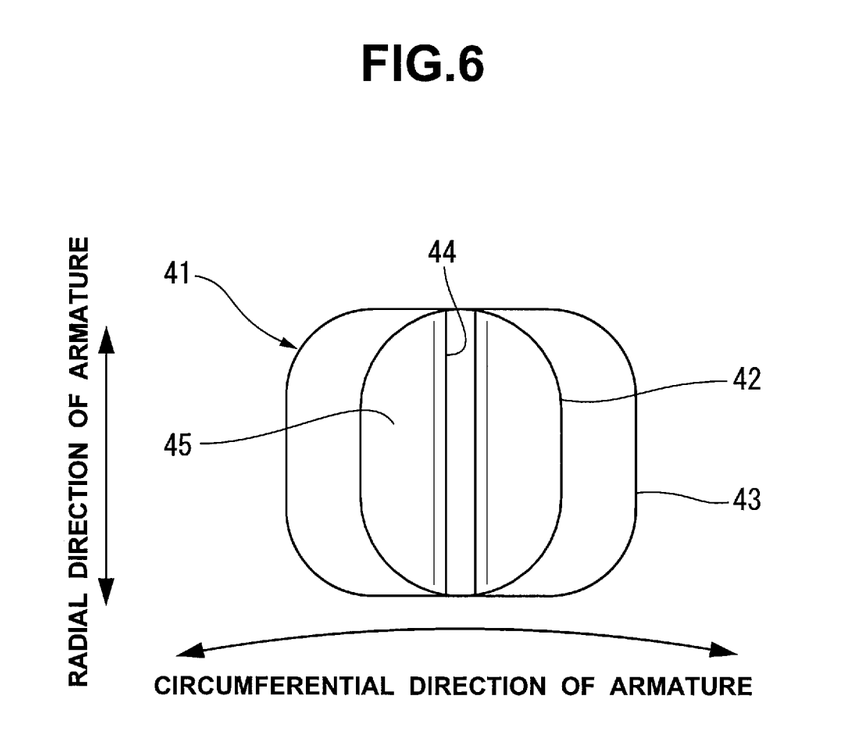
FIG. 6 is a front view of the anti-vibration member.

As shown in FIG. 6, the stopper portion 42 is formed into an elliptical shape that is long in the radial direction of the armature 14 (the vertical direction in FIG. 6) when viewed from the front side. The stopper portion 42 includes a slit 44 formed from a side (the front side) that is opposite to the side on which the stopper portion 42 is in contact with the damper portion 43. The slit 44 is formed in the central portion of the stopper portion 42 in the circumferential direction of the armature 14 (the horizontal direction in FIGS. 6 and 7), and extends in the radial direction of the armature 14.

Figure 7:
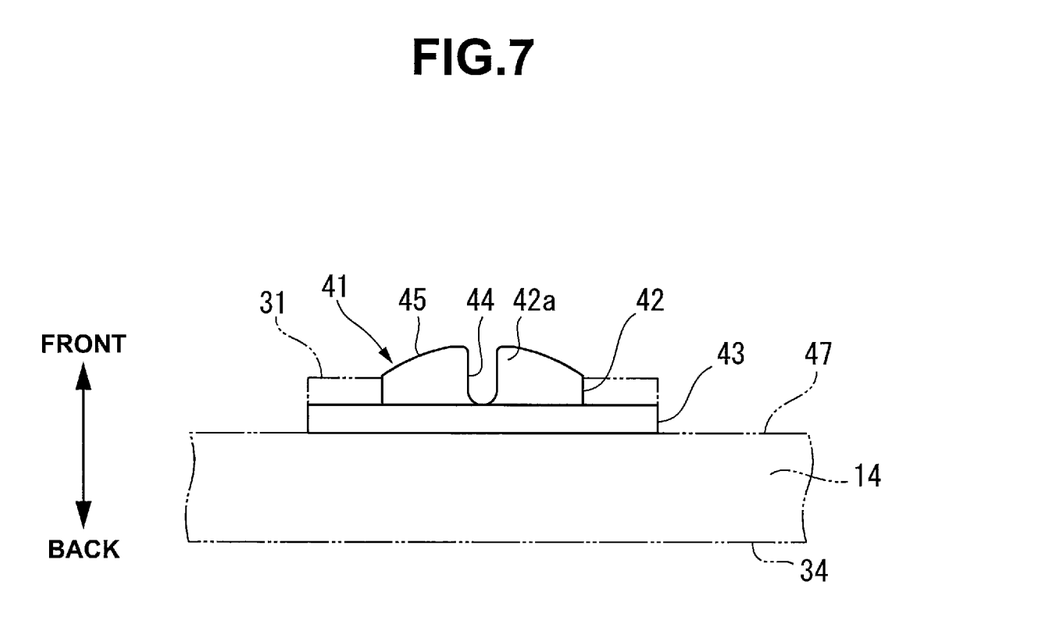
FIG. 7 is a side view of the anti-vibration member.

The stopper portion 42 according to this embodiment is press-fitted in the arm 31. That is, the stopper portion 42 is attached to the arm 31 in a state in which the stopper portion 42 elastically deforms in a direction in which the width of the slit 44 decreases. A front end portion 42a (see FIG. 7) of the stopper portion 42 projects (forward) in a direction opposite to the direction from the arm portion 31 to the armature 14 (i.e. it projects from the arm portion 31 in a direction away from the armature 14), in a state in which the anti-vibration member 41 is attached to the arm 31. The front end portion 42a shown in FIG. 7 is divided in the horizontal direction of FIG. 7 by the slit 44, but formed to have an arcuate sectional shape. That is, a stopper surface 45 formed by the front surface of the front end portion 42a has a convex surface that gradually projects forward in a direction from the two ends of the stopper portion 42 close to the arm 31 to the slit 44.

Also, as shown in FIG. 1, the stopper portion 42 projects from the arm 31 to the inside of the armature 14 in the radial direction, in a state in which the stopper portion 42 is attached to the arm 31. As shown in FIG. 2, in a state in which the armature 14 is spaced apart forward from the rotor 2, an inside projecting portion 46 described above comes in contact with the rear surface 18a of the flange portion 18 of the hub 15 from the side of the armature 14 in the axial direction of the hub 15.

As shown in FIG. 7, the damper portion 43 of the anti-vibration member 41 projects from the stopper portion 42 in the circumferential direction of the armature 14. The damper portion 43 of the anti-vibration member 41 attached to the arm 31 is sandwiched by the arm 31 and the armature 14 in a position closer to the armature 14 than the arm 31, and is always in contact with an end face 47 (the front surface) of the armature 14, which is opposite to the attraction surface 34, from the side of the flange portion 18 of the hub 15.

Figure 8:
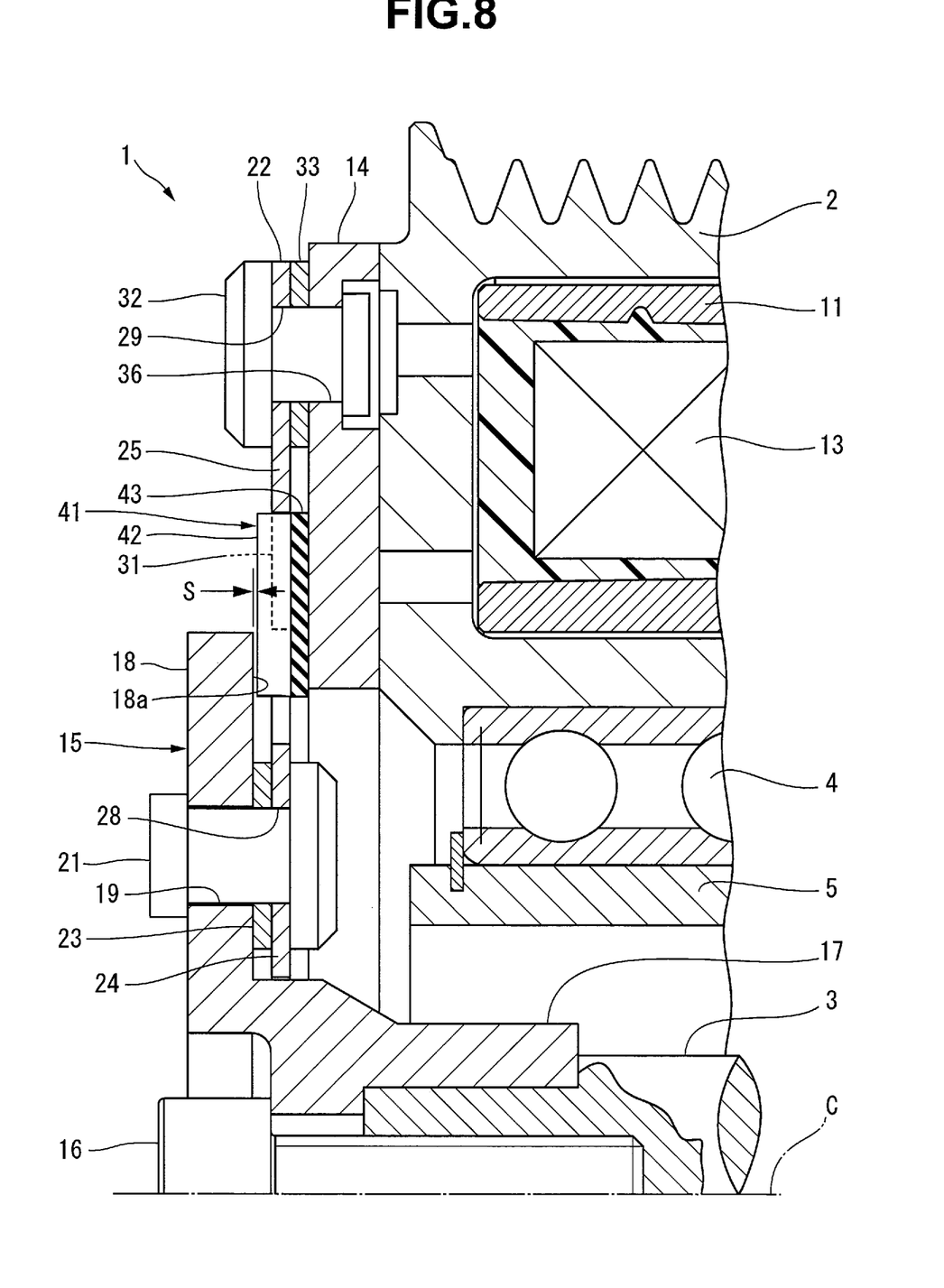
FIG. 8 is an enlarged sectional view showing main parts when magnetic attraction occurs.

The thickness (in the axial direction of the hub 15) of the anti-vibration member 41 according to this embodiment is smaller than the space between the armature 14 and the flange portion 18 of the hub 15. As shown in FIG. 8, however, a predetermined space S is formed between the front end of the stopper portion 42 and the flange portion 18 of the hub 15, in a state in which the armature 14 is in tight contact with the rotor 2. The space S is narrower than an air gap G (see FIG. 2) of the electromagnetic clutch 1. The air gap G is the space between the attraction surface 34 of the armature 14 and the attraction surface 8 of the rotor 2 when the electromagnetic coil 13 is not excited. Since the space S is narrower than the air gap G, the anti-vibration member 41 is sandwiched between and compressed by the flange portion 18 and the armature 14 when the electromagnetic coil 13 is not excited.

When the anti-vibration member 41 is replaced with another anti-vibration member (not shown) having a relatively large thickness, the leaf spring 22 elastically deforms and the free end portion 25 is positioned on the back side (the side of the armature 14) of the base end portion 24 when the electromagnetic coil 13 is not excited, and the practical spring force of the leaf spring 22 relatively increases. That is, the anti-vibration member 41 has a function of giving the leaf spring 22 a preset load.

When the electromagnetic coil 13 is excited by an electric current in the electromagnetic clutch 1 configured as described above, the field core 11, the rotor 2, and the armature 14 form the magnetic circuit Φ. Consequently, the armature 14 is attracted by the rotor 2, moved in the axial direction of the hub 15 against the spring force of the leaf springs 22, and magnetically attracted to the rotor 2. Since the armature 14 is connected to the rotor 2, the rotation of the rotor 2 is transmitted to the rotating shaft 3 via the armature 14, the leaf springs 22, and the hub 15.

When the armature 14 is magnetically attracted to the rotor 2, a collision with the rotor 2 generates a very small vibration on the armature 14. This vibration of the armature 14 is one cause of the generation of an impact sound. The damper portion 43 of the anti-vibration member 41 is in contact with the end face 47 (the front surface) of the armature 14 of the electromagnetic clutch 1 according to this embodiment. Therefore, the vibration of the armature 14 as a cause of the impact sound is transmitted to and damped by the damper portion 43. As a consequence, the impact sound when magnetic attraction occurs is reduced.

When the electric current to the electromagnetic coil 13 is cut off and the electromagnetic coil 13 is not excited any more, the armature 14 is spaced apart and released from the rotor 2 by the spring force of the leaf springs 22. Accordingly, the stopper portions 42 of the anti-vibration members 41 abut against the flange portion 18 of the hub 15 from behind. In this state, the anti-vibration members 41 elastically deform by being sandwiched between the armature 14 and the flange portion 18 of the hub 15. When the armature 14 is released, therefore, no impact sound is generated, or even if an impact sound is generated, this impact sound is reduced because the anti-vibration members 41 reduce the impact.

In the electromagnetic clutch 1 according to this embodiment as described above, the one type of anti-vibration members 41 can reduce the impact sound when the armature 14 is magnetically attracted to the rotor 2, and the impact sound when the armature 14 is released from the rotor 2. This decreases the number of anti-vibration members 41 when compared to the device disclosed in literature 1 in which two types of members are necessary to reduce these impact sounds. Accordingly, this embodiment can provide the electromagnetic clutch 1 that has the arrangement capable of reducing the impact sound both when the armature 14 is magnetically attracted to the rotor 2 and when the armature 14 is released from the rotor 2, and is inexpensive because the manufacturing cost is reduced.

The stopper portion 42 of the anti-vibration member 41 according to this embodiment is fitted in the arm 31 of the leaf spring 22 and projects in the direction opposite to the direction from the arm 31 to the armature 14. The damper portion 43 is sandwiched between the arm 31 and the armature 14. The anti-vibration member 41 is fixed to the leaf spring 22 and the armature 14 because the stopper portion 42 is press-fitted in the arm 31 of the leaf spring 22, and the damper portion 43 is sandwiched between the arm 31 and the armature 14.

In the device disclosed in literature 1, the anti-vibration member is fixed to the armature-side end portion of the leaf spring by, e.g., baking or adhesion. When fixing the anti-vibration member by the method like this, a vulcanizing step for performing baking or an adhesion step using an adhesive increases the number of manufacturing steps, so the manufacturing cost further rises. In this embodiment, however, the anti-vibration member 41 can be fixed to the leaf spring 22 without using any tool, and this obviates the need for the vulcanizing step for performing baking and the adhesive step using an adhesive. Since this facilitates attaching the anti-vibration member 41 to the leaf spring 22, the number of assembling steps decreases, so a more inexpensive electromagnetic clutch 1 can be provided.

In this embodiment, the apex (central portion) of the arm 31 of the leaf spring 22 is connected to the free end portion 25 of the leaf spring 22 via the elastic deformation allowing portion 38, and the two end portions of the arm 31 project toward the base end portion 24 of the leaf spring 22. Accordingly, the U-shaped arm 31 opens toward the axis C of the hub 15. Therefore, the apex of the U-shaped arm 31 can receive a centrifugal force acting on the anti-vibration member 41 when the leaf spring 22 rotates together with the rotor 2. This makes it possible to reliably prevent removal of the anti-vibration member 41 by the centrifugal force, although the anti-vibration member 41 is attached to the leaf spring 22 by using a simple attaching structure.

Note that the flange portion 18 of the hub 15 is equivalent to "a rotary member rotatable around the axis C". The rotor 2 is equivalent to "an attracting member arranged on the opposite side of the flange portion 18 of the hub 15 across the armature 14, accommodating the electromagnetic coil 13, and configured to attract the armature 14 by moving the armature 14 in the axial direction against the spring force of the leaf spring 22". Also, the free end portion 25, connecting portions 26, elastic deformation allowing portion 38, and arm 31 of the leaf spring 22 form "a moving portion 22a that moves in the axial direction together with the movement of the armature 14". The base end portion 24 of the leaf spring 22 forms "a non-moving portion 22b that does not move in the axial direction". The number of leaf springs 22 need only be two or more, but is preferably three or more.

Second Embodiment

Figure 9:
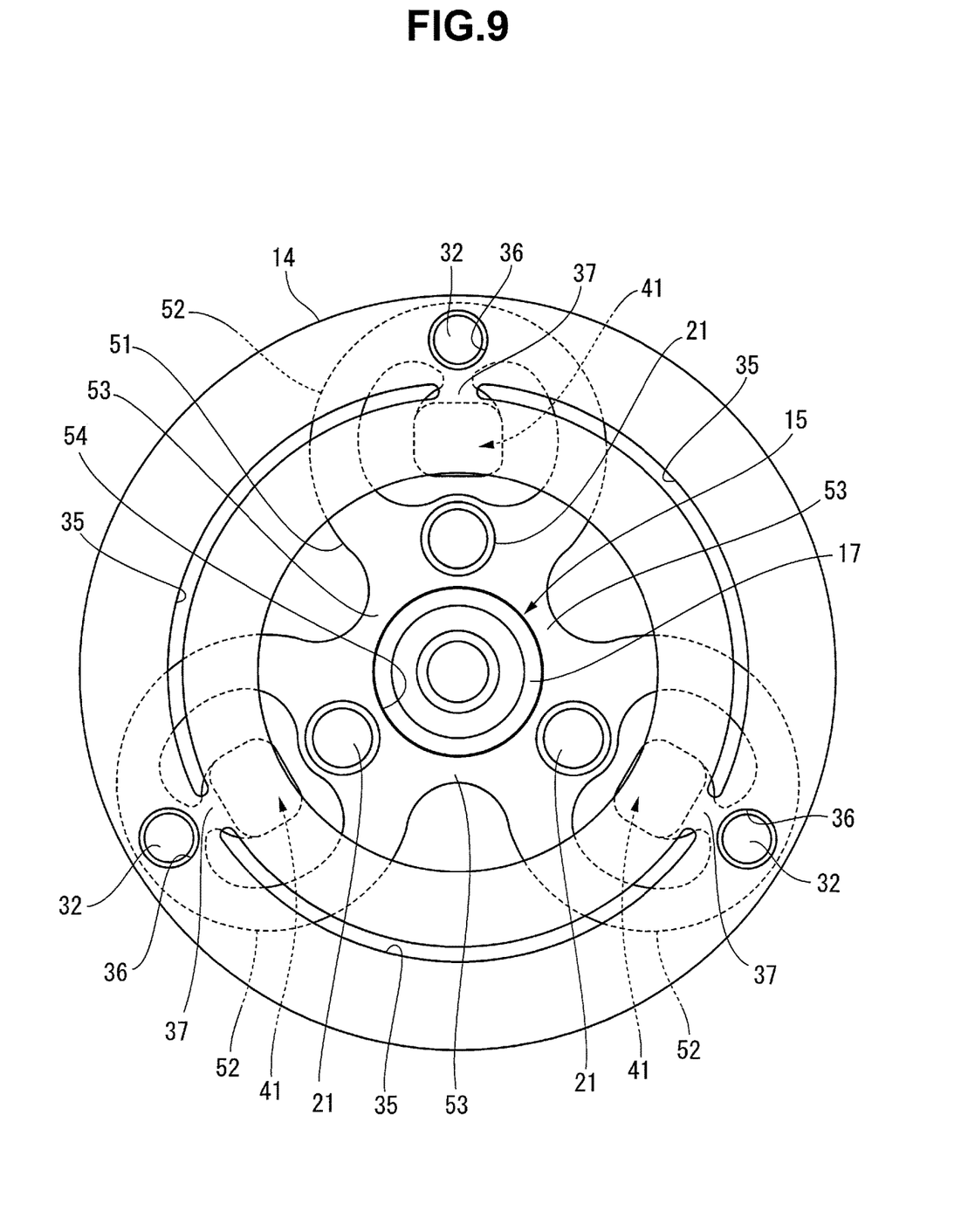
FIG. 9 is a rear view in which an assembly including a hub, a leaf spring, and an armature is viewed from behind in the second embodiment of the present invention.

A leaf spring can be formed as shown in FIG. 9. Referring to FIG. 9, the same reference numerals as explained with reference to FIGS. 1 to 8 denote the same or equal members, and a detailed explanation thereof will be omitted as needed.

A leaf spring 51 shown in FIG. 9 has three leaf spring main bodies 52 equivalent to the ring-like leaf springs 22 disclosed in the first embodiment. The leaf spring main body 52 has the same structure as that of the leaf spring 22, i.e., includes a moving portion 22a including a free end portion 25, and a non-moving portion 22b including a base end portion 24. The base end portions 24 of the leaf spring main bodies 52 adjacent to each other are connected via a connecting portion 53 extending in the circumferential direction of an armature 14. A circular hole 54 is formed in the central portion of the leaf spring 51 including the connecting portions 53 and the base end portions 24 of the three leaf spring main bodies 52. A boss portion 17 of a hub 15 is inserted into the circular hole 54.

Even when using the leaf spring 51 formed as described above, an impact sound when the clutch is operated can be reduced in the same manner as in the first embodiment. When compared to the first embodiment, this embodiment decreases the number of leaf springs and hence improves the ease of assembly when assembling an electromagnetic clutch 1. Note that the number of leaf spring main bodies 52 need only be two or more, but is preferably three or more.

Third Embodiment

Figure 10:
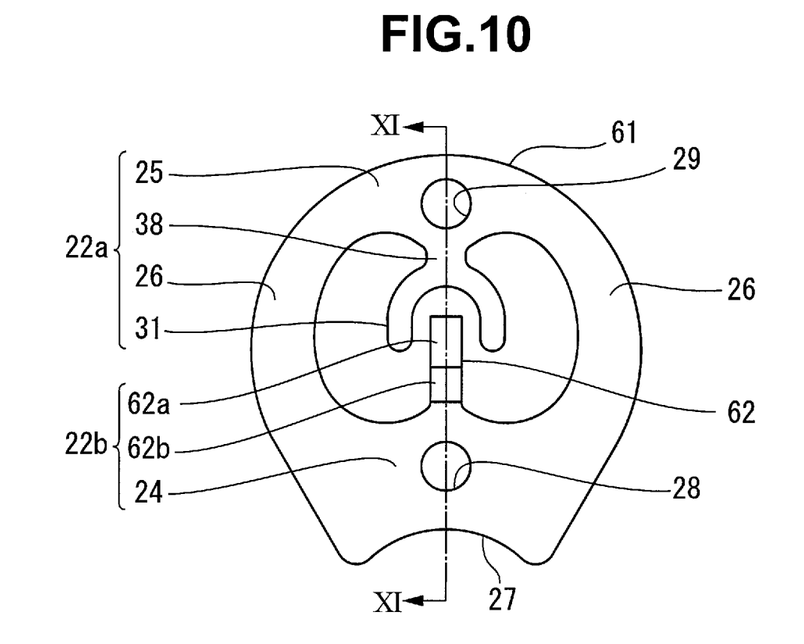
FIG. 10 is a front view of a leaf spring in the third embodiment of the present invention.
Figure 11:
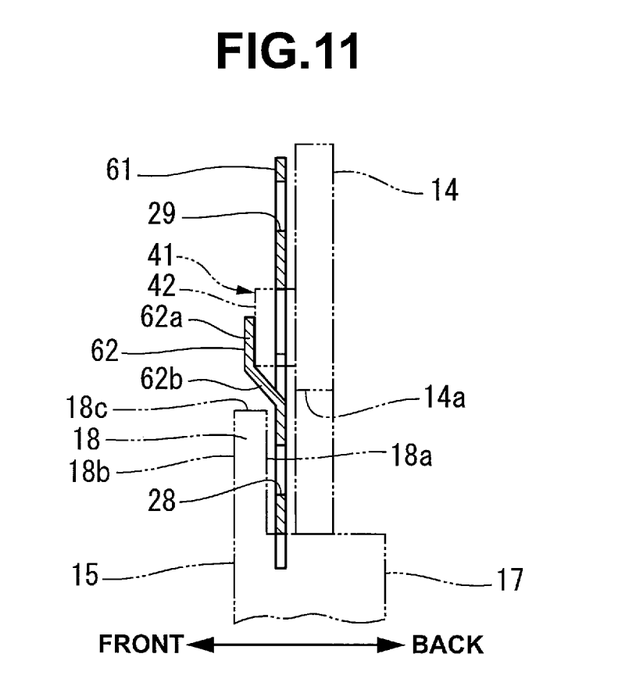
FIG. 11 is a sectional view taken along a line XI-XI shown in FIG. 10.

A leaf spring can be formed as shown in FIGS. 10 and 11. Referring to FIGS. 10 and 11, the same reference numerals as explained with reference to FIGS. 1 to 8 denote the same or equal members, and a detailed explanation thereof will be omitted.

A leaf spring 61 shown in FIGS. 10 and 11 is formed by adding a stopper piece 62 in the central portion of the leaf spring 22 disclosed in the first embodiment. The stopper piece 62 extends from a base end portion 24 to a free end portion 25 of the leaf spring 61 when viewed from the front side, and extends to the front side (in a direction away from an armature 14) when viewed sideways. The stopper piece 62 includes a distal end portion 62a, and an inclined portion 62b connecting the distal end portion 62a and the base end portion 24 of the leaf spring 22. The distal end portion 62a is parallel to the base end portion 24 of the leaf spring 61. The inclined portion 62b is inclined with respect to the armature 14 so as to gradually extend forward in the direction away from the base end portion 24.

Accordingly, the distal end portion 62a of the stopper piece 62 is positioned closer to the front side than the base end portion 24. As shown in FIG. 10, the stopper piece 62 is positioned inside an arm 31 when viewed from the front side. The stopper piece 62 according to this embodiment is included in "a non-moving portion 22b that does not move in the axial direction".

When adopting this embodiment, as shown in FIG. 11, an outer circumferential portion 18c of a flange portion 18 of a hub 15 can be positioned inside an inner circumferential portion 14a of the armature 14. This can make the outer diameter of the flange portion 18 smaller than the inner diameter of the armature 14, thereby reducing the weight. The leaf spring 61 according to this embodiment is fixed to a rear surface 18a or a front surface 18b of the flange portion 18 as described above.

When using the leaf spring 61 as shown in FIGS. 10 and 11, a stopper portion 42 of an anti-vibration member 41 comes in contact with the distal end portion 62a of the stopper piece 62 from behind (from the side of the armature 14 in the axial direction of the hub 15) when an electric current to an electromagnetic coil 13 is cut off and the armature 14 returns to the initial position by the spring force of the leaf spring 61. During this contact, the anti-vibration member 41 elastically deforms and reduces the impact. Even when using the leaf spring 61 formed as shown in FIGS. 10 and 11, therefore, an impact sound when the clutch is operated can be reduced in the same manner as in the first embodiment.

Note that the leaf spring as disclosed in the second embodiment can be formed by using the leaf spring 61 according to this embodiment. This leaf spring includes a plurality of leaf spring main bodies each equivalent to the leaf spring 61 including the stopper piece 62. The base end portions 24 of leaf spring main bodies adjacent to each other are connected to each other via a connecting portion.

In each of the first to third embodiments, an example of the case in which the present invention is applied to an electromagnetic clutch is disclosed. However, the present invention is also applicable to an electromagnetic brake having a structure in which an armature is magnetically attracted to a braking member. When applying the present invention to the electromagnetic brake, although not shown, it is possible to adopt an arrangement in which a non-rotary braking member is installed instead of the rotor 2 of each of the above-described embodiments, and the armature 14 is magnetically attracted to the braking member during a braking operation. The braking member can be formed by, e.g., the field core 11. In this case, the field core 11 forms the above-described attracting member.

Effect of the Embodiments

In the above-described embodiments, an impact sound when the armature 14 is attracted to the attracting member 2, 11 is reduced because the vibration of the armature 14 is transmitted to the damper 43 of the anti-vibration member 41 and damped by the anti-vibration member 41. On the other hand, when the armature 14 is released from the attracting member 2, 11, an impact sound is reduced because the anti-vibration member 41 elastically deforms by being sandwiched between the armature 14 and the rotary member 18 or the non-moving portion 22b of the leaf spring 61 and reduces the impact.

Consequently, the one type of anti-vibration member 41 can reduce the impact sound when the armature 14 is attracted to the attracting member 2, 11, and the impact sound when the armature 14 is released from the attracting member 2, 11. The number of anti-vibration members decreases compared to the device disclosed in literature 1 in which the two types of members are required to reduce these impact sounds. According to the above-described embodiments, therefore, an electromagnetic connecting device capable of reducing the impact sound both when the armature 14 is attracted and when it is released can be manufactured with a low manufacturing cost.

What is claimed is:

1. An electromagnetic connecting device comprising:
    a rotary member rotatable around an axis;
    an armature arranged in an axial direction parallel to the axis with respect to the rotary member;
    a leaf spring including a base end portion fixed to the rotary member, and a free end portion connected to the armature;
    an electromagnetic coil;
    an attracting member arranged on an opposite side from the rotary member across the armature, accommodating the electromagnetic coil, and configured to attract the armature by moving the armature in the axial direction against a spring force of the leaf spring when an electric current is supplied to the electromagnetic coil; and
    an anti-vibration member formed by an elastic material, wherein the leaf spring includes:
    a moving portion that includes the free end portion and moves in the axial direction together with movement of the armature; and
    a non-moving portion that includes the base end portion and does not move in the axial direction,
    the anti-vibration member is fixed to the moving portion of the leaf spring, and
    the anti-vibration member includes:
    a stopper that is formed by the elastic material and comes in contact with one of the rotary member and the non-moving portion of the leaf spring from a side of the armature; and
    a damper that is formed by the elastic material and comes in contact with the armature from a side of the rotary member.

2. The device according to claim 1, wherein the damper projects toward the armature from the stopper.

3. The device according to claim 1, wherein the leaf spring includes:
    a plurality of leaf spring main bodies each including the moving portion and the non-moving portion; and
    a connecting portion that connects the plurality of leaf spring main bodies.

4. An electromagnetic connecting device comprising:
    a rotary member rotatable around an axis;
    an armature arranged in an axial direction parallel to the axis with respect to the rotary member,
    a leaf spring including a base end portion fixed to the rotary member, and a free end portion connected to the armature;
    an electromagnetic coil,
    an attracting member arranged on an opposite side from the rotary member across the armature accommodating the electromagnetic coil, and configured to attract the armature by moving the armature in the axial direction against a spring force of the leaf spring when an electric current is supplied to the electromagnetic coil; and
    an anti-vibration member formed by an elastic material, wherein the leaf spring includes:
    a moving portion that includes the free end portion and moves in the axial direction together with movement of the armature; and
    a non-moving portion that includes the base end portion and does not move in the axial direction,
    the anti-vibration member is fixed to the moving portion of the leaf spring, and
    the anti-vibration member includes:
    a stopper that comes in contact with the one of the rotary member and the non-moving portion of the leaf spring from a side of the armature; and
    a damper that comes in contact with the armature from a side of the rotary member, wherein
    the moving portion of the leaf spring includes an arm projecting from the free end portion and formed into a U-shape when viewed in the axial direction,
    the stopper is fitted in the arm, and projects from the arm in a direction away from the armature, and
    the damper is sandwiched between the arm and the armature.

5. The device according to claim 4, wherein the arm opens toward the axis.

6. The device according to claim 4, wherein the stopper includes a slit formed from a side opposite to the side on which the stopper comes in contact with the damper, and is press-fitted in the arm in a state in which the stopper elastically deforms in a direction in which the width of the slit decreases.

7. An electromagnetic connecting device comprising:
    a rotary member rotatable around an axis;
    an armature arranged in an axial direction parallel to the axis with respect to the rotary member;
    a leaf spring including a base end portion fixed to the rotary member, and a free end portion connected to the armature;
    an electromagnetic coil;
    an attracting member arranged on an opposite side from the rotary member across the armature accommodating the electromagnetic coil, and configured to attract the armature by moving the armature in the axial direction against a spring force of the leaf spring when an electric current is supplied to the electromagnetic coil; and
    an anti-vibration member formed by an elastic material, wherein the leaf spring includes:
    a moving portion that includes the free end portion and moves in the axial direction together with movement of the armature; and
    a non-moving portion that includes the base end portion and does not move in the axial direction,
    the anti-vibration member is fixed to the moving portion of the leaf spring, and
    the anti-vibration member includes:

a stopper that comes in contact with the one of the rotary member and the non-moving portion of the leaf spring from a side of the armature; and a damper that comes in contact with the armature from a side of the rotary member, wherein the anti-vibration member includes a thickness smaller than a space between one of the rotary member and the non-moving portion and the armature.

8. An electromagnetic connecting device comprising:

a rotary member rotatable around an axis;

an armature arranged in an axial direction parallel to the axis with respect to the rotary member, a leaf spring including a base end portion fixed to the rotary member, and a free end portion connected to the armature;

an electromagnetic coil, an attracting member arranged on an opposite side from the rotary member across the armature accommodating the electromagnetic coil, and configured to attract the armature by moving the armature in the axial direction against a spring force of the leaf spring when an electric current is supplied to the electromagnetic coil; and an anti-vibration member formed by an elastic material, wherein the leaf spring includes:

a moving portion that includes the free end portion and moves in the axial direction together with movement of the armature; and a non-moving portion that includes the base end portion and does not move in the axial direction, the anti-vibration member is fixed to the moving portion of the leaf spring, and the anti-vibration member includes:

a stopper that comes in contact with the one of the rotary member and the non-moving portion of the leaf spring from a side of the armature; and a damper that comes in contact with the armature from a side of the rotary member, wherein the non-moving portion of the leaf spring includes a stopper piece extending from the base end portion in a direction away from the armature, and the stopper is configured to come in contact with the stopper piece.

9. The device according to claim 8, wherein the stopper piece includes a distal end portion parallel to the base end portion, and an inclined portion that connects the base end portion and the distal end portion and is inclined with respect to the armature, and the stopper is configured to come in contact with the distal end portion.

10. The device according to claim 8, wherein the armature includes a ring-like shape, and an outer diameter of the rotary member is smaller than an inner diameter of the armature.

* * * * *